United States Patent
Kim et al.

(10) Patent No.: US 11,012,626 B2
(45) Date of Patent: May 18, 2021

(54) ELECTRONIC DEVICE FOR PROVIDING QUALITY-CUSTOMIZED IMAGE BASED ON AT LEAST TWO SETS OF PARAMETERS

(71) Applicant: Samsung Electronics Co., Ltd., Suwon-si (KR)

(72) Inventors: Junghoon Kim, Suwon-si (KR); Hongsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/432,276

(22) Filed: Jun. 5, 2019

(65) Prior Publication Data

US 2019/0379837 A1   Dec. 12, 2019

(30) Foreign Application Priority Data

Jun. 7, 2018 (KR) .................. 10-2018-0065595

(51) Int. Cl.
*H04N 5/232* (2006.01)
*H04N 5/235* (2006.01)
(Continued)

(52) U.S. Cl.
CPC ....... *H04N 5/232935* (2018.08); *G06T 5/009* (2013.01); *H04N 5/2351* (2013.01); *H04N 5/23216* (2013.01); *H04N 9/735* (2013.01)

(58) Field of Classification Search
CPC ............ H04N 5/232935; H04N 9/735; H04N 5/2351; H04N 5/23216; H04N 5/232; G06T 5/009
See application file for complete search history.

(56) References Cited

U.S. PATENT DOCUMENTS 8,908,987 B1 * 12/2014 Krishnaswamy ....... G06T 5/001
382/260
2007/0132860 A1    6/2007 Prabhu et al.
(Continued)

FOREIGN PATENT DOCUMENTS

EP         2 779 630 A2    9/2014
KR    10-2011-0105059 A    9/2011
(Continued)

OTHER PUBLICATIONS

Extended European Search Report dated Oct. 9, 2019, issued in a counterpart European application No. 19178882.7-1208.
(Continued)

*Primary Examiner* — Padma Haliyur
(74) *Attorney, Agent, or Firm* — Jefferson IP Law, LLP

(57) ABSTRACT

An electronic device is provided. The electronic device includes a camera, a display, a memory, a communication module, and a processor configured to identify a plurality of parameter sets related to image capturing from an external device using the communication module, provide, in a first preview, at least part of one or more images using the display during at least part of obtaining the one or more images using the camera, generate one or more first corrected images to which a first parameter set among the plurality of parameter sets is applied, using the one or more images, generate one or more second corrected images to which a second parameter set among the plurality of parameter sets is applied, using the one or more images, identify priority for the plurality of parameter sets, and provide, in a second preview, one or more among the one or more first corrected images and the one or more second corrected images according to the priority during at least part of providing the first preview.

20 Claims, 11 Drawing Sheets

(51) Int. Cl.
 *G06T 5/00* (2006.01)
 *H04N 9/73* (2006.01)

(56) References Cited

U.S. PATENT DOCUMENTS

| | | | |
|---|---|---|---|
| 2007/0288973 A1* | 12/2007 | Glatron | H04N 5/2352 |
| | | | 725/105 |
| 2010/0194963 A1 | 8/2010 | Terashima | |
| 2010/0266269 A1 | 10/2010 | Nagao et al. | |
| 2014/0320697 A1 | 10/2014 | Lammers et al. | |
| 2016/0227105 A1 | 8/2016 | Kobayashi et al. | |
| 2018/0131878 A1 | 5/2018 | Charlton et al. | |

FOREIGN PATENT DOCUMENTS

| | | |
|---|---|---|
| KR | 10-2017-0070715 A | 6/2017 |
| WO | 2017-047012 A1 | 3/2017 |

OTHER PUBLICATIONS

European Office Action dated Mar. 12, 2020, issued in European Patent Application No. 19178882.7.

\* cited by examiner

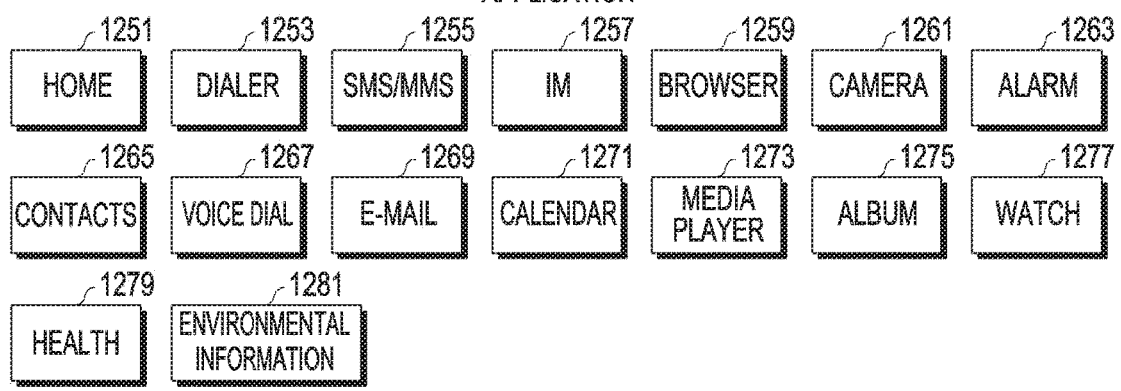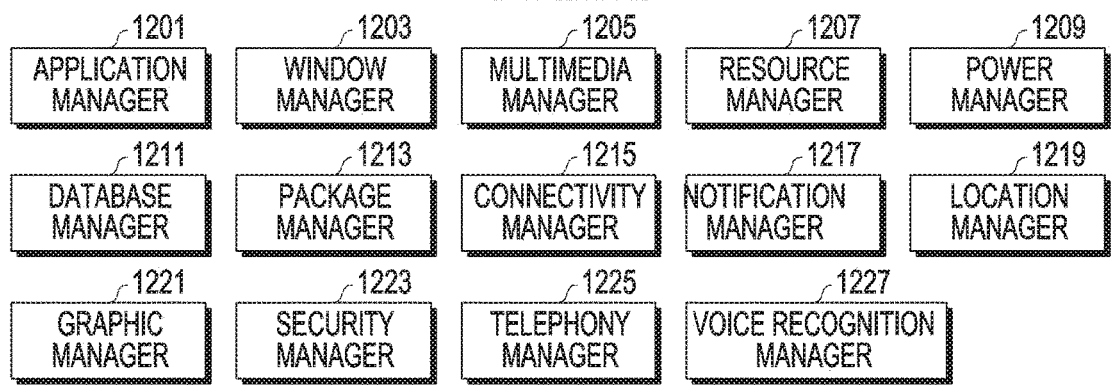
FIG.12

ELECTRONIC DEVICE FOR PROVIDING QUALITY-CUSTOMIZED IMAGE BASED ON AT LEAST TWO SETS OF PARAMETERS

CROSS-REFERENCE TO RELATED APPLICATION(S)

This application is based on and claims priority under 35 U.S.C. § 119(a) of a Korean patent application number 10-2018-0065595, filed on Jun. 7, 2018, in the Korean Intellectual Property Office, the disclosure of which is incorporated by reference herein in its entirety.

BACKGROUND

1. Field

The disclosure relates to a method of providing quality-customized images based on learned user preference.

2. Description of Related Art

With smartphones, tablet personal computers (PCs), and other portable electronic devices spreading, portable electronic devices are coming up with advanced functionalities. As people routinely carry their portable electronic devices, the photoshoot functionality has drastically increased in use and is a major factor customers consider when purchasing a portable electronic device. A common perception of cameras equipped in portable electronic devices was poor default performance versus digital cameras in the past. The recent growth of lens and image sensor technology along with various camera functions, however, has led to considerable performance advancement in the built-in cameras of portable electronic devices to put them on par with regular digital cameras.

As portable electronic device cameras become good enough to replace digital cameras, users can perform expert-class photography and image editing on their portable electronic devices. To prevent image quality deterioration of objects to be photographed or photography environments, portable electronic devices may support various photography modes, such as auto-mode, expert mode, or artificial intelligence (AI) camera mode and provide detailed setting options, such as shutter speed, white balance, International Organization for Standardization (ISO), color, or exposure correction, thereby enabling image capturing adjusted to user taste and preference.

With heightened expectations of portable electronic device cameras, recent portable electronic devices are coming up with various capturing modes, e.g., auto-mode, expert mode, or AI camera mode, as well as upgrading capturing functionalities and image quality. For example, the auto-mode sets the parameters to those proposed by the manufacturer or expert group which eliminates the need for separately setting each image option. Despite such convenience, this mode, however, may produce quality deterioration in certain environments and fails to reflect a user's own preference and taste. The expert mode enables detailed adjustment of parameters according to capturing environment and allows the user to obtain high-definition images. However, this mode entails the hassle of resetting the parameters fitting every changing environment and may be difficult to manipulate for normal users with no expertise. The AI camera mode recommends parameter settings fitting the object to be captured or the capturing environment with every capture. By its own limitations, this mode may equivocally classify setting parameters for the user's preference and apply the optimal settings only under some particular conditions.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for controlling an electronic device and an external electronic device which may accrue and learn capturing-related setting parameter information corresponding to an image stored by the user upon image capturing using the camera of a portable electronic device and provide a quality-customized image reflecting the user's preference based thereupon.

Additional aspects will be set forth in part in the description which follows and, in part, will be apparent from the description, or may be learned by practice of the presented embodiments.

In accordance with an aspect of the disclosure, an electronic device is provided. The electronic device includes a camera, a display, a memory, a communication module, and a processor configured to identify a plurality of parameter sets related to image capturing from an external device using the communication module, provide, in a first preview, at least part of one or more images using the display during at least part of obtaining the one or more images using the camera, generate one or more first corrected images to which a first parameter set among the plurality of parameter sets is applied, using the one or more images, generate one or more second corrected images to which a second parameter set among the plurality of parameter sets is applied, using the one or more images, identify a priority of the plurality of parameter sets, and provide, in a second preview, one or more among the one or more first corrected images and the one or more second corrected images according to the priority during at least part of providing the first preview.

In accordance with another aspect of the disclosure, a server configured to provide customized camera quality setting information for an electronic device is provided. The server includes a communication module, a memory, and a processor configured to obtain information regarding one or more images selected by a user of the electronic device, identify preference information regarding a camera setting of the electronic device based on the information regarding the one or more images, and provide a plurality of parameter sets based on the preference information to the electronic device via the communication module to enable the electronic device to provide, in a preview, a corrected image resulting from applying at least part of the plurality of parameter sets to a captured image.

In accordance with another aspect of the disclosure, a method of controlling an electronic device configured to provide a quality-customized image is provided. The method includes identifying a plurality of parameter sets related to image capturing from an external device, providing, in a first preview, at least part of one or more images using a display during at least part of obtaining the one or more images, generating one or more first corrected images to which a first parameter set among the plurality of parameter sets is applied, using the one or more images, generating one or more second corrected images to which a second parameter set among the plurality of parameter sets is applied, using the one or more images, identifying a priority of the plurality of parameter sets, and providing, in a second preview, one or more among the one or more first corrected images and the one or more second corrected images according to the priority during at least a part of providing the first preview.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be apparent from the following detailed description taken in conjunction with the accompanying drawings, wherein:

FIG. 12 is a block diagram illustrating a program according to an embodiment of the disclosure.

Throughout the drawings, like reference numerals will be understood to refer to like parts, components, and structures.

DETAILED DESCRIPTION

Figure 1:
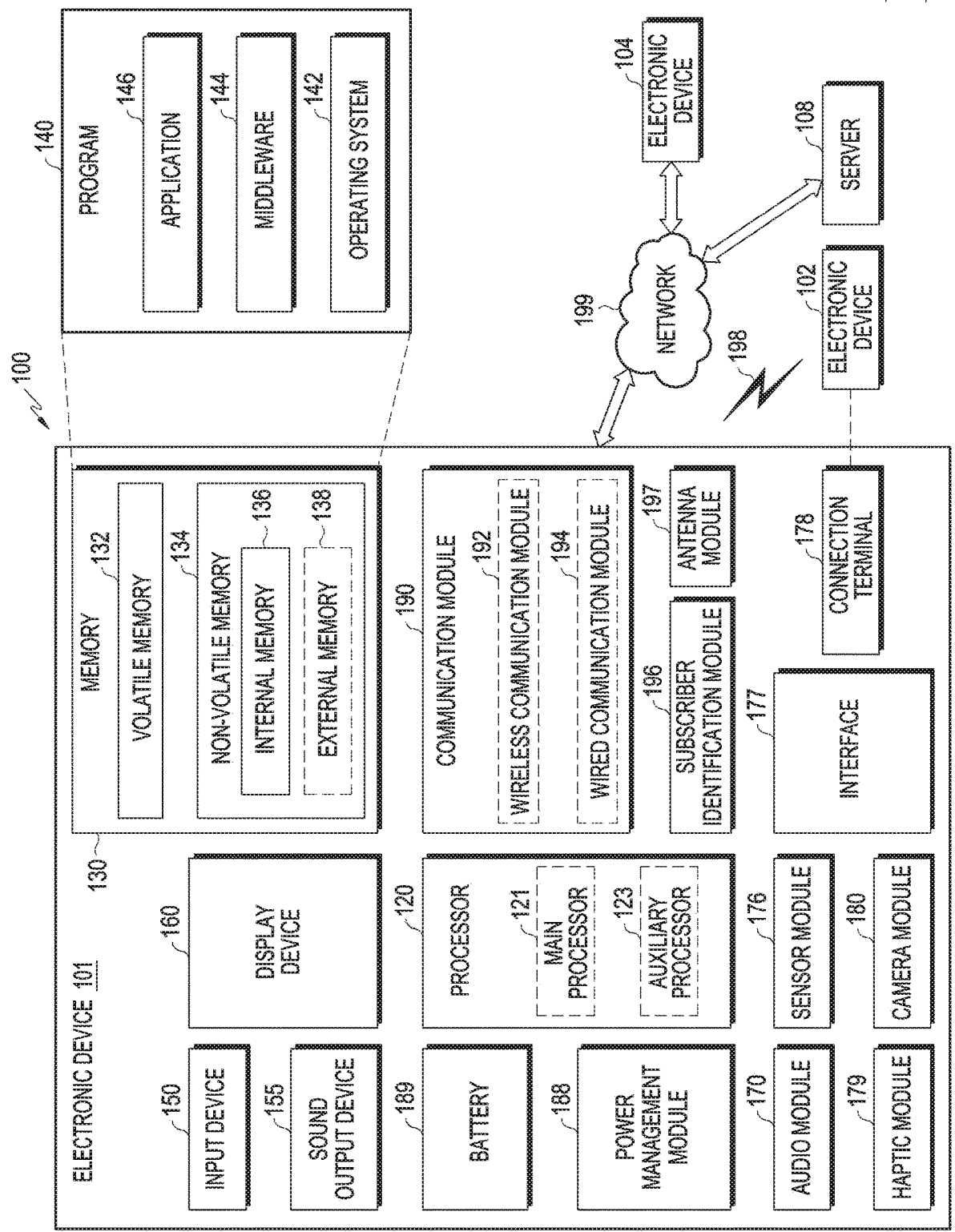
FIG. 1 is a block diagram illustrating an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the disclosure.

Examples of the electronic device may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to an embodiment of the disclosure, the electronic device may be a smart home appliance. Examples of the smart home appliance may include at least one of a television (TV), a digital video disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to other embodiments, examples of the electronic device may also include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning satellite (GPS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, automatic teller's machines (ATMs), point of sale (POS) devices, or internet of things (IoT) devices (e.g., a bulb, various sensors, an electric or gas meter, a sprinkler, a fire alarm, a thermostat, a street light, a toaster, fitness equipment, a hot water tank, a heater, or a boiler).

According to some embodiments, examples of the electronic device may include at least one of part of a piece of furniture or building/structure, an electronic board, an electronic signature receiving device, a projector, or various measurement devices (e.g., devices for measuring water, electricity, gas, or electromagnetic waves). According to various embodiments, the electronic device may be one or a combination of the above-listed devices. According to some embodiments, the electronic device may be a flexible electronic device. The electronic device disclosed herein is not limited to the above-listed devices, and may include new electronic devices depending on the development of technology.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 1801, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
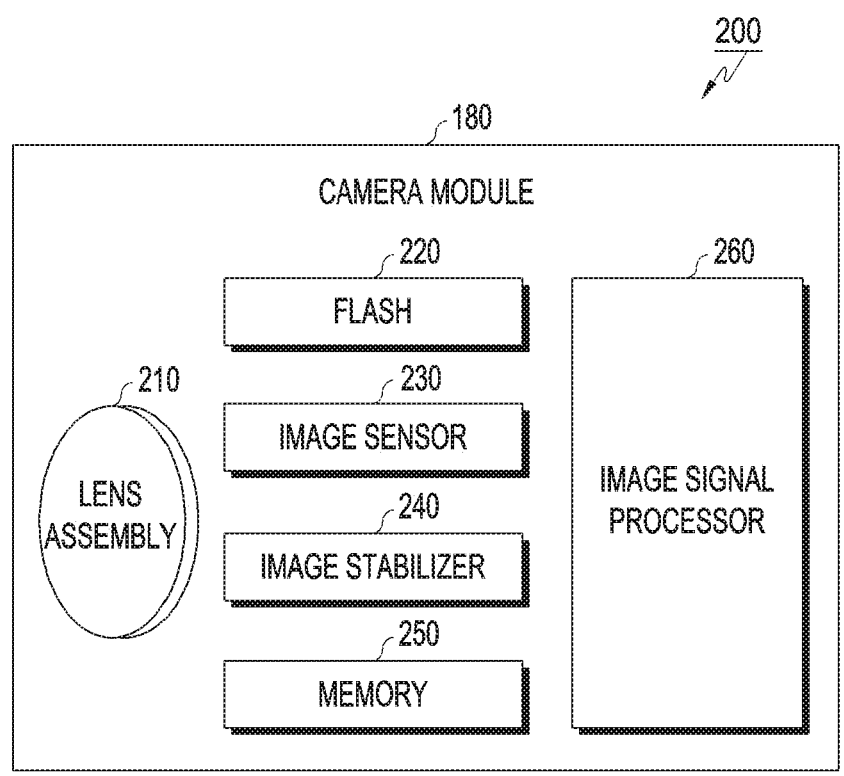
FIG. 2 is a block diagram illustrating a camera module of an electronic device according to an embodiment of the disclosure.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
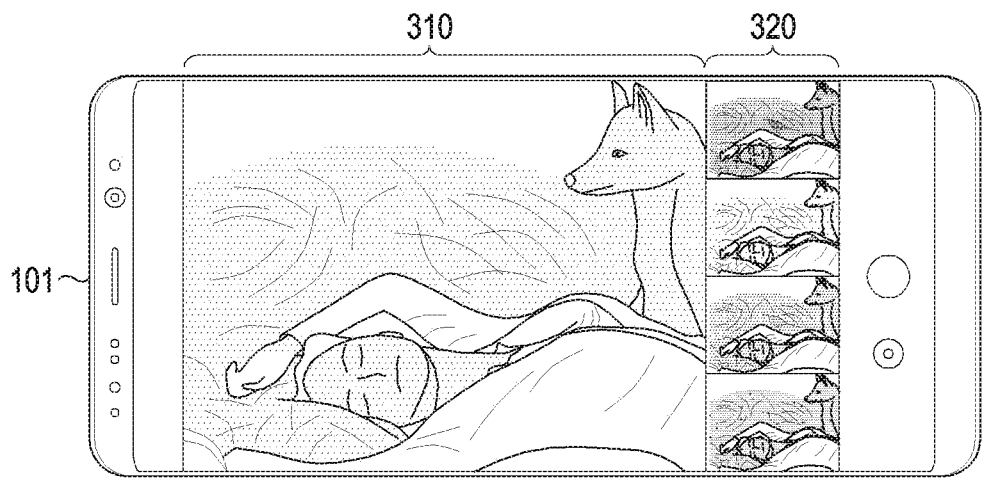
FIG. 3A is a view illustrating an example scheme of providing a quality-customized image according to an embodiment of the disclosure.
Figure 3B:
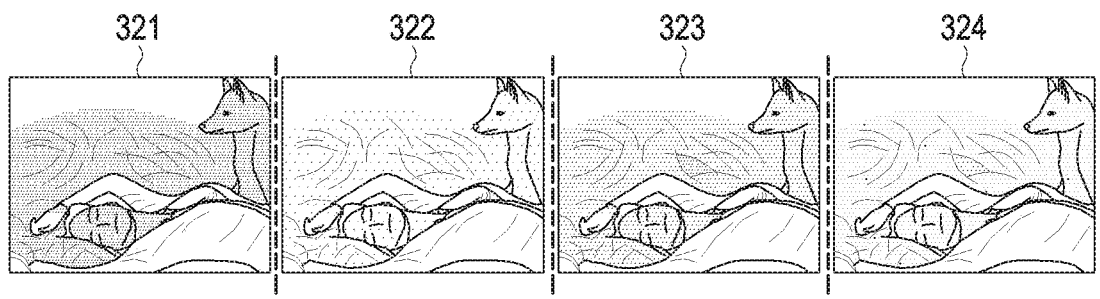
FIG. 3B is a view illustrating an example scheme of providing a preview for a set of corrected images based on various setting parameters according to an embodiment of the disclosure.

FIG. 3A is a view illustrating an example scheme of providing a quality-customized image according to an embodiment of the disclosure. FIG. 3B is a view illustrating an example scheme of providing a preview for a set of corrected images based on various setting parameters according to an embodiment of the disclosure.

Referring to FIG. 3A, when a camera 180 of an electronic device 101 operates, a plurality of images to which image capturing-related setting parameters have been applied may be displayed on the display. The setting parameters may include at least one value of light, color, shutter speed, focusing mode, or white balance set in the camera 180 depending on the capturing environment. The setting parameters may be applied to correspond to the quality identified to be preferred by the user of the electronic device 101. When the camera of the electronic device 101 is rendered to face a target object while running, the electronic device 101 may display a first preview 310 for a captured image according to current settings. A second preview 320 for at least one corrected image to which one or more setting parameters applicable to the camera 180 have been applied may be displayed on any one side of the first preview 310. According to an embodiment, the setting parameters corresponding to one or more corrected images displayed in the second preview 320 may be applied reflecting the user's preference analyzed by a big data-based deep learning algorithm, and the one or more corrected images may be provided in the second preview 320 depending on the priority for each setting parameter. The screen of the second preview 320 may be configured as shown in FIG. 3B.

Referring to FIG. 3B, corrected images 321, 322, 323, and 324 resulting from applying a plurality of different setting parameters to the same scene may be displayed in real-time in the second preview 320. The corrected images 321, 322, 323, and 324 may have different capturing-related setting parameters applied, e.g., light, color, shutter speed, focusing mode, or white balance, thus reflecting different qualities. According to an embodiment, the corrected images 321, 322, 323, and 324 displayed in the second preview 320 may be displayed considering the user's preference depending on the capturing environment or position and be displayed in a limited space within the display at a lower resolution than the image displayed in the first preview 310. The user's preference may be analyzed to propose a quality of image which is to be preferred by the user considering the user's profile. During this course, a big data-based deep learning algorithm may be used. Such user preference analysis may be performed by a server 108 connected via a network with the electronic device 101 and be identified on the electronic device 101. The server 108 may be a cloud server capable of data transmission and reception with the electronic device 101 in a cloud-based communication scheme. According to an embodiment, the user preference analysis may be performed to propose a quality of image expected to be preferred by the user given such items as the user's gender, age, or country besides information regarding the prior quality setting chosen by the user in a particular capturing environment. When a result of the user preference analysis may not be used, a quality of image set by an expert group may be displayed in the second preview 320. According to an embodiment, a quality of image according to the user preference analysis and a quality of image set by the expert group may together be provided in the second preview 320.

The number of corrected images displayed in the second preview 320 is not limited and, upon exceeding the number of images displayable on one screen, be scrolled and displayed in the space of the second preview 320.

According to an embodiment, an image selected by the user among the corrected images in the second preview 320 may be increased for resolution and frame size and be displayed in the first preview 310. Information regarding the setting parameters corresponding to the selected image may be transmitted to the server 108 and be used to update the result of the user preference analysis.

Figure 4:
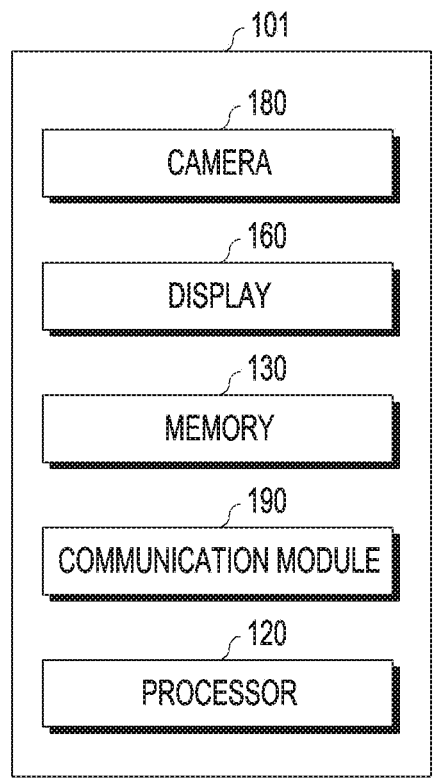
FIG. 4 is a block diagram illustrating an electronic device according to an embodiment of the disclosure.

FIG. 4 is a block diagram illustrating an electronic device 101 according to an embodiment of the disclosure.

Referring to FIG. 4, an electronic device 101 may be a device (e.g., a smartphone or tablet computer) to provide captured images in a customized quality and may include a camera (e.g., the camera module 180), a display 160, a memory 130, a communication module 190, or a processor 120.

According to an embodiment, the processor 120 may identify a plurality of parameter sets related to image capturing received from an external device via the communication module 190. The external device may be a server 108 connected via a network with the electronic device 101 and capable of data transmission and reception in a cloud-based communication scheme and may provide the electronic device 101 with quality setting information reflecting the preference of the user of the electronic device 101 using a big data-based deep learning algorithm. The parameter set may be a combination of values associated with the quality of captured image and may include at least one value of light, color, shutter speed, focusing mode, or white balance set in the camera 180.

According to an embodiment, the electronic device 101 may further include a position information module. The processor 120 may obtain position information of the electronic device 101 using the position information module and obtain a plurality of parameter sets based on the position information. The position information module may include at least one of Wi-Fi, global positioning system (GPS), or a gyro sensor capable of using a geographic information system (GIS). According to an embodiment, the processor 120 may obtain the plurality of parameter sets based on information regarding the capturing environment. The capturing environment-regarding information may include at least one of capturing time, capturing target object, weather, place, or model of the electronic device 101. The plurality of parameter sets may be provided to be able to display an appropriate quality of image considering the capturing environment or position of the electronic device 101 and, when there is user preference information previously identified, the user preference may additionally be considered.

The processor 120 may obtain one or more images using the camera 180 and, during at least part of obtaining the one or more images, provide at least part of the one or more images as a first preview using the display 160. The first preview may display the one or more images in a quality corresponding to the setting parameter or capturing mode currently applied to the camera 180. According to an embodiment, the first preview may be provided with the setting parameter optimized for the current capturing environment set by the expert group or manufacturer of the electronic device 101 automatically being applied.

The processor 120 may apply one or more of the plurality of parameter sets to the one or more images, thereby generating one or more corrected images. For example, the processor 120 may generate one or more first corrected images by applying a first parameter set among the plurality of parameter sets to the one or more images and one or more second corrected images by applying a second parameter set among the plurality of parameter sets to the one or more images. The first corrected image and the second corrected image may be images of quality identified to be preferred by the user of the electronic device 101 and may be provided in a second preview distinguished from the first preview.

The processor 120 may identify a priority for the plurality of parameter sets. The priority may be used to identify one or more parameter sets to be applied to the one or more images among the plurality of parameter sets or order of display of one or more corrected images to which the one or more parameter sets have been applied. The priority may be set based on profile information about the user of the electronic device 101. The user profile information may include at least one of the user's gender, age, country, or prior quality setting information. The priority may be identified by the electronic device 101 on its own or received from an external device.

During at least part of providing the first preview, the processor 120 may provide, as the second preview, one or more of the one or more first corrected images and the one or more second corrected images. The second preview may be displayed on any one side of the first preview and may be provided at a lower resolution and smaller frame size than the image in the first preview. The images displayed in the second preview are not limited in number and may be displayed in an order based on the priority identified considering the user profile or capturing environment. An image selected by the user among one or more images displayed in the second preview may be increased for resolution and frame size and be displayed in the first preview.

The processor 120 may store one or more images corresponding to one or more selected previews of the first preview and the second preview. The one or more images stored may be used in identifying the user preference information. For example, the processor 120 may generate or update user preference information based on the parameter set corresponding to the one or more images stored and may adjust the priority using the user preference information. According to an embodiment, adjustment of the priority may be performed by an external electronic device. In this case, the external electronic device may analyze the user preference according to the capturing environment or position of the electronic device 101 using a big data-based deep learning algorithm, identify the priority for the quality of image to be preferred by the user of the electronic device 101 based on the result of analysis, and transfer information regarding the identified priority to the electronic device 101. According to an embodiment, adjustment of the priority may be performed by the processor 120 based on the user preference information analyzed by the external electronic device. In this case, when the external electronic device analyzes or updates the user preference information through the big data-based deep learning algorithm and transmits the result to the electronic device 101, the processor 120 may identify the priority using the user preference information received from the external electronic device.

The processor 120 may additionally provide a setting menu to change the detailed quality settings of one or more images corresponding to the first preview or second preview through the display 160. The user may vary the detailed setting parameters to match the user's desired quality of image on the setting menu. Thus, more user convenience and satisfaction may be achieved in the capturing process using the electronic device 101.

According to an embodiment, the electronic device 101 comprises a camera 180, a display 160, a memory 130, a communication module 190, and a processor 120 configured to identify a plurality of parameter sets related to image capturing from an external device using the communication module 190, provide, in a first preview, at least part of one or more images using the display 160 during at least part of obtaining the one or more images using the camera 180, generate one or more first corrected images to which a first parameter set among the plurality of parameter sets is applied, using the one or more images, generate one or more second corrected images to which a second parameter set among the plurality of parameter sets is applied, using the one or more images, identify priority for the plurality of parameter sets, and provide, in a second preview, one or more among the one or more first corrected images and the one or more second corrected images according to the priority during at least part of providing the first preview.

According to an embodiment, the processor 120 may be configured to store one or more images corresponding to one or more previews selected from the first preview and the second preview.

According to an embodiment, the processor 120 may be configured to generate or update user preference information based on a parameter set of the one or more images stored and adjust the priority using the user preference information.

According to an embodiment, the electronic device 101 may further comprise a position information module. The processor 120 may be configured to obtain position information about the electronic device using the position information module and obtain the plurality of parameter sets based on the position information.

According to an embodiment, the processor 120 may be configured to obtain the plurality of parameter sets based on information regarding a capturing environment of the one or more images. The information regarding the capturing environment may include at least one of capturing time, capturing target object, weather, place, or model of the electronic device 101.

According to an embodiment, a priority may be set based on user profile information about the electronic device 101. The user profile information may include at least one of gender, age, or country of the user of the electronic device 101, or prior quality setting information.

According to an embodiment, the parameter sets may include at least one value of light, color, shutter speed, focus mode, or white balance set in the camera 180.

According to an embodiment, the processor 120 may be configured to additionally provide a setting menu to change a detailed setting of one or more images corresponding to the first preview or the second preview through the display 160.

Figure 5:
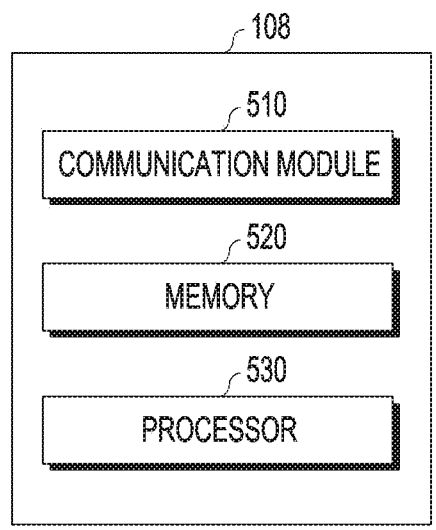
FIG. 5 is a block diagram illustrating a server providing customized camera quality setting information for an electronic device according to an embodiment of the disclosure.

FIG. 5 is a block diagram illustrating a server 108 providing customized camera quality setting information for an electronic device according to an embodiment of the disclosure.

Referring to FIG. 5, the server 108 is a device to provide customized camera quality setting information for an electronic device 101 to allow the electronic device 101 to provide a quality-customized image and may include a communication module 510, a memory 520, or a processor 530.

According to an embodiment, the processor 530 may obtain information regarding one or more images selected by the electronic device 101. The information regarding the one or more images may include at least one of a setting parameter set corresponding to the one or more images, position information, capturing environment information, or profile information about the user of the electronic device 101.

The processor 530 may analyze preference information regarding the camera settings of the electronic device 101 based on the information regarding the one or more images. The preference information may be information regarding a quality of image which may be preferred by the user, corresponding to at least one of the position of the electronic device 101 at the time of capturing, capturing environment, or user profile and may be analyzed using a big data-based deep learning algorithm. The processor 530 may classify the setting parameter sets corresponding to the one or more images according to at least one item of the position information about the one or more images, capturing environment information, or user profile information; assign weights to the setting parameter sets; and analyze the preference information based on the weights. The preference information analysis may be repeatedly performed whenever gathering information regarding an image selected from the electronic device 101 or periodically at each designated time, and the statistics regarding selection by other users, as well as the preference of the user of the electronic device 101, may be taken into consideration.

The processor 530 may transmit a plurality of parameter sets related to image capturing on the electronic device 101 based on the analyzed preference information to the electronic device 101 using the communication module 510. The plurality of parameter sets may be quality setting information corresponding to a quality of image expected to be preferred by the user of the electronic device 101, and each parameter set may be constituted of a combination of at least one value of the light, color, shutter speed, focusing mode, or white balance set in the camera 180 of the electronic device 101. Upon receiving the plurality of parameter sets from the server 108, the electronic device 101 may apply at least part of the plurality of parameter sets to an image captured by the camera 180 to generate a corrected image and may provide the generated corrected image as a preview.

The plurality of parameter sets may be provided considering at least one of the position, capturing environment, or user profile at the time of capturing the image on the electronic device 101. To that end, when the camera 180 of the electronic device 101 is identified to be running, the processor 530 may obtain capturing-related information at the time of running the camera 180 using the communication module 510 and provide the plurality of parameter sets corresponding to the capturing-related information according to the priority identified based on the analyzed preference information. The capturing-related information may include at least one of position information about the electronic device 101 identified at the time of running the camera 180, capturing environment information, or user profile information. The priority may be identified based on the weights of the setting parameter sets classified per item during the course of analysis of preference information, and the order of display of corrected images provided as the preview may be identified by the priority.

According to an embodiment, the server 108 may comprise a communication module 510, a memory 520, and a processor 530 configured to obtain information regarding one or more images selected on the electronic device 101, identify preference information regarding a camera setting of the electronic device 101 based on the information regarding the one or more images, and provide a plurality of parameter sets based on the preference information to the electronic device 101 via the communication module 510 to enable the electronic device to provide, in a preview, a corrected image resulting from applying at least part of the plurality of parameter sets to a captured image.

According to an embodiment, the information regarding the one or more images may include at least one of a setting parameter set corresponding to the one or more images, position information, capturing environment information, or profile information about a user of the electronic device.

According to an embodiment, the processor 530 may be configured to classify a setting parameter set corresponding to the one or more images according to at least one item among position information about the one or more images, capturing environment information, or user profile information; assign a weight thereto; and identify preference information about a camera setting of the electronic device 101 based on the weight.

According to an embodiment, the processor 530 may be configured to, when a camera 180 of the electronic device 101 is identified to run, obtain capturing-related information at a time of the running and provide the plurality of parameter sets corresponding to the capturing-related information according to priority identified based on the preference information.

Figure 6:
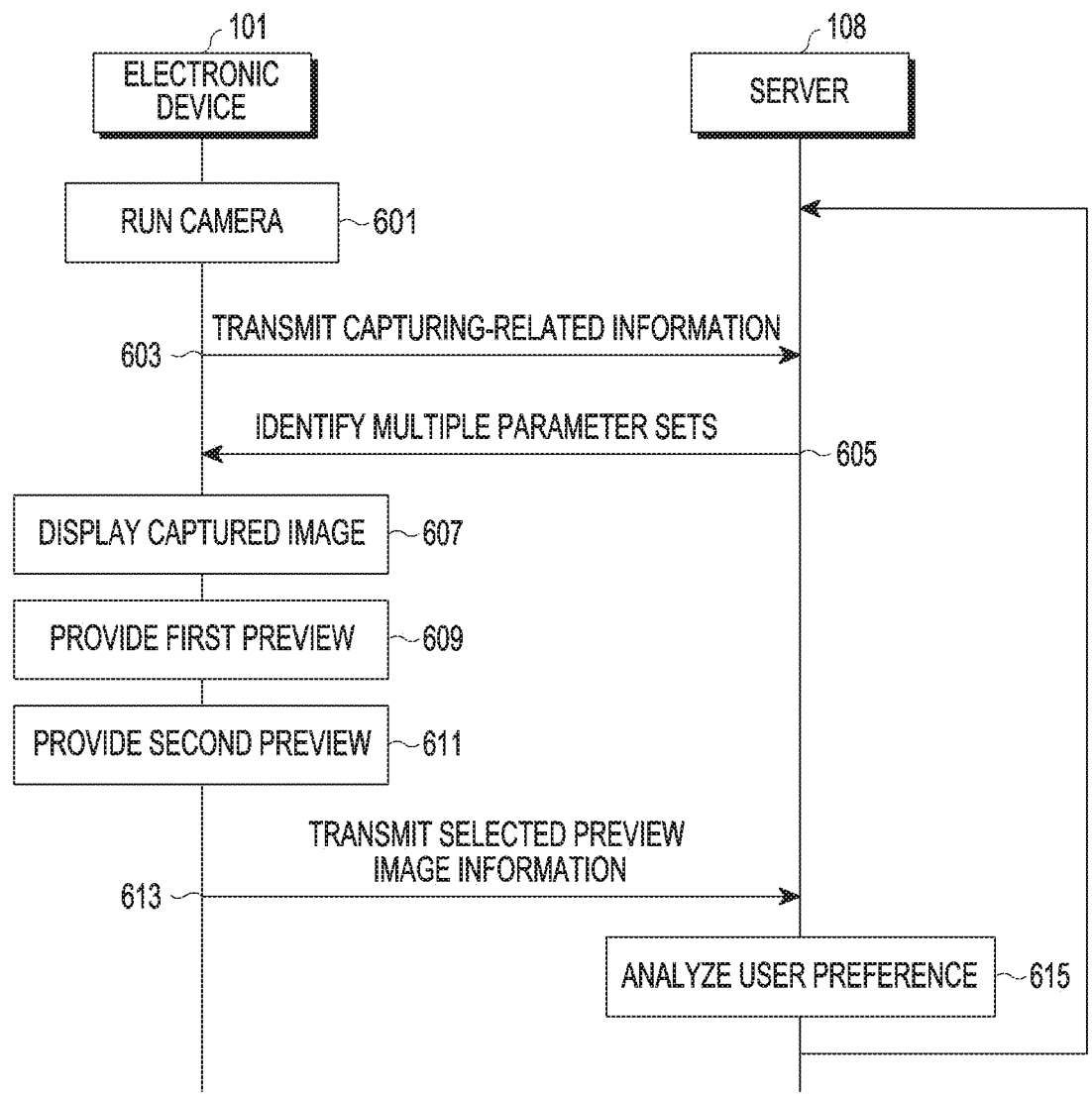
FIG. 6 is a flowchart illustrating a procedure for providing a quality-customized image according to an embodiment of the disclosure.

FIG. 6 is a flowchart illustrating a procedure for providing a quality-customized image according to an embodiment of the disclosure.

Referring to FIG. 6, an electronic device 101 may communicate with a server 108 via a network 199. A camera of the electronic device 101 may be executed to capture an image in operation 601.

In operation 603, the electronic device 101 (e.g., the processor 120) may transmit capturing-related information at the time of running the camera to the server 108. The capturing-related information may include at least one of position information about the electronic device 101, capturing environment information, or user profile information. The capturing environment information may include at least one of capturing time, capturing target object, weather, place, or model of the electronic device 101. The user profile information may include at least one of the user's gender, age, country, or prior quality setting information.

In operation 605, the server 108 (e.g., the processor 530) may transmit a plurality of parameter sets identified based on the capturing-related information to the electronic device 101. The plurality of parameter sets may be quality setting information corresponding to a quality of image to be preferred by the user of the electronic device 101, and each parameter set may be constituted of a combination of at least one value of the light, color, shutter speed, focusing mode, or white balance set in the camera. The electronic device 101 may provide a quality of image matching the user's preference based on the plurality of parameter sets identified from the server 108.

In operation 607, the electronic device 101 (e.g., the processor 120) may display one or more images captured using the camera on the display. In operation 609, the electronic device 101 (e.g., the processor 120) may provide, as a first preview, at least part of the one or more images during at least part of displaying the image. The first preview may display the one or more images in a quality corresponding to the setting parameter or capturing mode currently applied to the camera of the electronic device 101. For example, when the capturing mode of the camera is set to an auto-mode, the first preview may be provided with the setting parameter optimized for the current capturing environment set by the expert group or manufacturer of the electronic device 101 automatically being applied. According to an embodiment, the first preview may be provided based on the user's prior setting information stored in the memory of the electronic device 101. For example, the electronic device 101 may provide the first preview considering the setting parameter corresponding to the image stored by the user under a similar condition to the current capturing environment.

In operation 611, the electronic device 101 (e.g., the processor 120) may generate one or more corrected images by applying one or more of the plurality of parameter sets identified in operation 605 to the one or more images and real-time provide at least part of the one or more corrected images in a second preview. The second preview may be displayed on any one side of the display to be distinguished from the first preview and may be provided at a resolution and frame size smaller than the image in the first preview.

In operation 613, the electronic device 101 (e.g., the processor 120) may provide the server 108 with information regarding one or more images corresponding to one or more previews selected by the user of the first preview and the second preview. The information regarding the one or more images may be utilized in analyzing the user's preference for the quality of captured image and include at least one of a setting parameter set corresponding to the one or more images, position information, capturing environment information, or profile information about the user of the electronic device 101.

In operation 615, the server 108 (e.g., the processor 530) may analyze the user preference using information regarding the one or more images. The server 108 may classify the setting parameter sets corresponding to the one or more images according to at least one item of the position information about the one or more images, capturing environment information, or user profile information, assign weights to the setting parameter sets, and calculate the priority according to capturing conditions and analyze the user preference based on the weights. The priority may be used to identify one or more parameter sets to be applied to the one or more images among the plurality of parameter sets or order of display, in the second preview, of one or more corrected images to which the one or more parameter sets have been applied.

The user preference analysis may be performed using a big data-based deep learning algorithm and may be repeatedly performed whenever gathering information regarding the image selected from the electronic device 101 or periodically at a designated time. The result of analysis of the user preference may be then used at the time when new capturing is initiated on the electronic device 101. For example, when the camera application is executed again for new image capturing on the electronic device 101 so that the capturing-related information is transmitted to the server 108, the server 108 may identify a plurality of parameter sets for new capturing considering the capturing-related information at the time of the new capturing, together with the analyzed user preference. In identifying a quality of image expected to be preferred by the user at the time of new capturing, the server 108 may identify one or more qualities of images corresponding to the condition of capturing-related information received from the electronic device 101 after the new capturing is initiated and transmit parameter sets for the one or more qualities of images identified to the electronic device 101.

Figure 7:
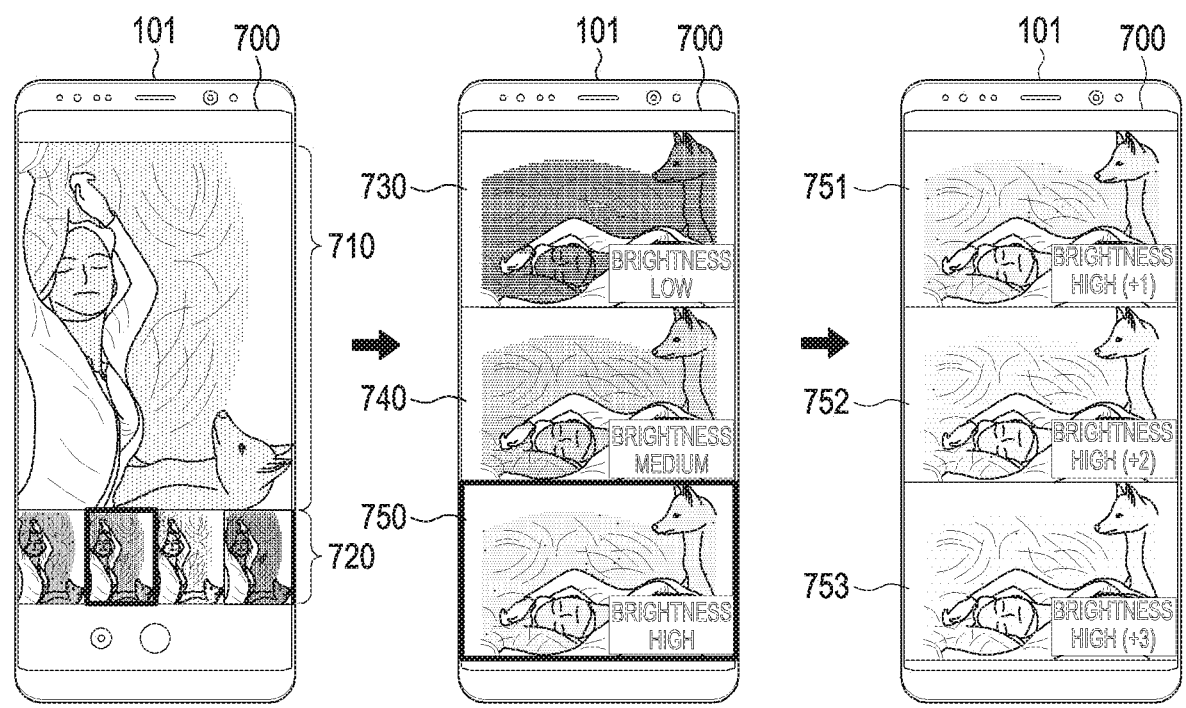
FIG. 7 is a view illustrating an example scheme of selecting a user-preferred quality of image via an electronic device according to an embodiment of the disclosure.

FIG. 7 is a view illustrating an example scheme of selecting a user-preferred quality of image via an electronic device 101 according to an embodiment of the disclosure.

Referring to FIG. 7, when a target object is captured with the camera of the electronic device 101 running, one or more qualities of images obtainable by the user through the electronic device 101 may be displayed, as a preview, on the display 700. When the camera runs and the capturing procedure of the electronic device 101 begins, the capturing image according to the current settings is displayed in a first preview 710, and the image corrected in the quality identified to be preferred by the user may be displayed in a second preview 720. The images displayed in the second preview 720 may be corrected images resulting from applying one or more of a plurality of parameter sets identified from the server 108 to the captured image, and the plurality of parameter sets may be identified by the server 108 considering the user preference analyzed via a big data-based deep learning algorithm. The number of images displayed in the second preview 720 is not limited and, upon exceeding the number of images displayable on one screen, may be scrolled and displayed in the space of the second preview 720. Since the corrected images displayed in the second preview 720 need to be displayed in a limited space, the corrected images may be smaller in resolution and frame size than the image displayed in the first preview 710. A corrected image selected by the user among the corrected images displayed in the second preview 720 may be increased for resolution and frame size and be displayed in the first preview 710.

According to an embodiment, the electronic device 101 may vary the detailed setting parameter values related to capturing via a plurality of operations to provide a quality of image matching the user's preference. When the user selects a first corrected image set to 'high' in color contrast among the corrected images of the second preview 720 displayed on the display of the electronic device 101, corrected images 730, 740, and 750 set to have different levels of brightness with respect to the first corrected image may be displayed on the display 160. When the user selects a second corrected image set to 'high' in brightness among the corrected images 730, 740, and 750, corrected images 751, 752, and 753 set to have different detailed brightness adjustment values with respect to the second corrected image may additionally be displayed on the display 160. The operation of selecting such a corrected image may be provided on the front or side of the display 160 of the electronic device 101.

Figure 8:
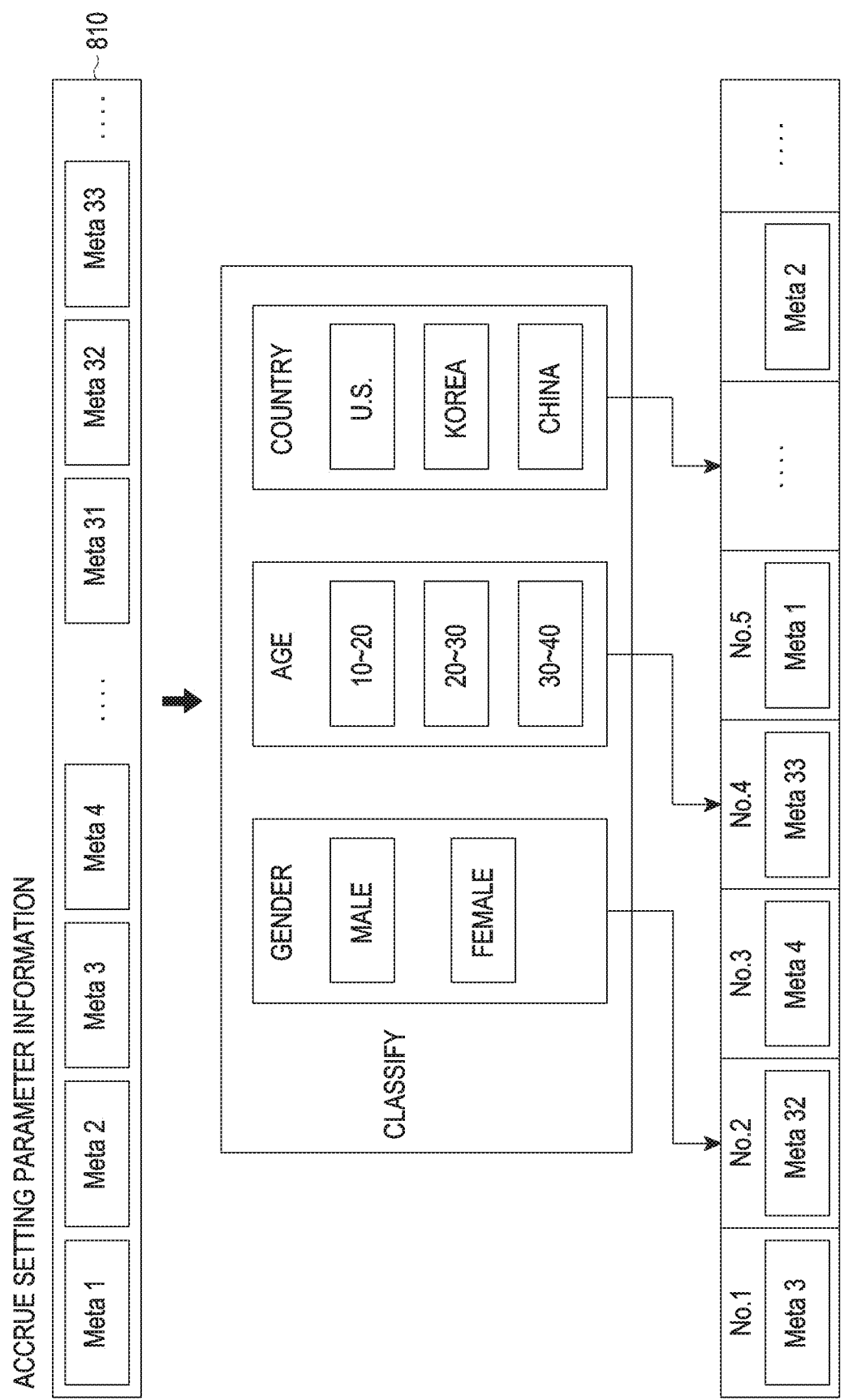
FIG. 8 is a view illustrating an example scheme of analyzing a user's preference based on accrued setting parameter information according to an embodiment of the disclosure.

FIG. 8 is a view illustrating an example scheme of analyzing a user's preference based on accrued setting parameter information according to an embodiment of the disclosure.

Referring to FIG. 8, setting parameter information 810 corresponding to a captured image selected and stored by the user may be accrued (or accumulated) for user preference analysis. The user preference analysis may be performed by the server 108 connected via a network with the electronic device 101 and capable of data transmission and reception in a cloud-based communication scheme. The server 108 may gather quality setting information about the captured image selected from a plurality of electronic devices and analyze the user preference using a big data-based deep learning algorithm.

According to an embodiment, when the user selects and stores one or more of preview images provided through the display of the electronic device 101, information regarding the stored images may be transferred to the server 108. The information regarding the stored images may include at least one of a setting parameter set corresponding to the images, position information, capturing environment information, or user profile information. The server 108 may gather the information regarding the stored images from the plurality of electronic devices and analyze the user preference based on the accrued information. For example, the server 108 may classify the pieces of setting parameter information corresponding to the images according to at least one item of the position information about the image, capturing environment information, or user profile information based on information regarding each of the gathered images, assign weights thereto, sum up the weights and identify the priority per piece of setting parameter information. The position information may mean the position of the electronic device 101 at the time of capturing the image. The capturing environment information may mean a capturing condition including at least one of capturing time, capturing target object, weather, place, or model of the electronic device 101. The user profile information may include at least one of the user's gender, age, country, or prior quality setting information. The priority may be used to identify a plurality of pieces of setting parameter information expected to be preferred by the user corresponding to a new capturing condition when new capturing is initiated on the electronic device 101 or to identify the order of display of corrected images to which the plurality of parameter sets have been applied.

When an image is captured on the electronic device 101, the weight assigned to the setting parameter information may be varied depending on the user's selection to adjust the priority. Thus, a captured image of the quality reflecting the user's preference may be provided.

Figure 9:
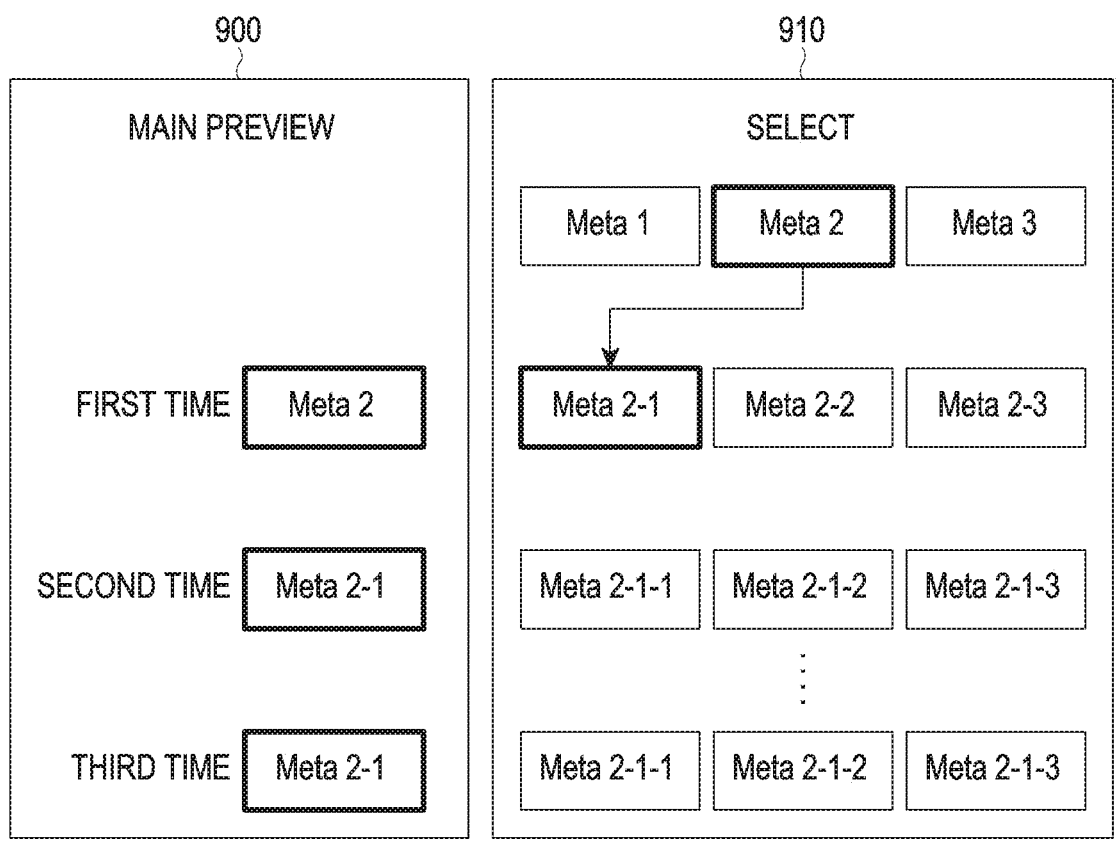
FIG. 9 is a view illustrating an example scheme of providing a preview according to selection of a setting parameter according to an embodiment of the disclosure.

FIG. 9 is a view illustrating an example scheme of providing a preview according to selection of a setting parameter according to an embodiment of the disclosure.

Referring to FIG. 9, when an image capturing process by the electronic device 101 is initiated, a plurality of pieces of setting parameter information corresponding to qualities of images to be preferred by the user may be provided to the electronic device 101. The electronic device 101 may display, in a preview on the display, a plurality of corrected images to which the plurality of pieces of setting parameter information have been applied. For example, three corrected images, one to which setting parameter set 1 is applied, another to which setting parameter set 2 is applied, and the other to which setting parameter set 3 is applied, may be provided in an auxiliary preview 910. When the user selects the corrected image corresponding to setting parameter set 2 among the corrected images in the auxiliary preview 910, the corrected image may be displayed in a main preview 900, and the corrected images for which different values have been set for the other parameters with respect to the corrected image may be displayed in the auxiliary preview 910. When the user selects the corrected image corresponding to setting parameter set 2-1 among the corrected images in the auxiliary preview 910, the corrected image displayed in the main preview 900 may be switched to the corrected image corresponding to setting parameter set 2-1, and the corrected images for which different values have been set for the detailed parameter adjustment values with respect to the corrected image may additionally be displayed in the auxiliary preview 910. When the user does not select the corrected images additionally displayed in the auxiliary preview 910 but finally selects and stores the corrected image corresponding to setting parameter set 2-1 currently displayed in the main preview 900, the image displayed in the main preview 900 does not switch and the weight of setting parameter set 2-1 is increased and reflected on the user preference.

According to an embodiment, when there is no image of the quality desired by the user among the corrected images provided in the auxiliary preview, the setting parameters identified by the expert group or manufacturer of the electronic device 101 or the setting parameters identified by analyzing the preference of other users who are under similar capturing conditions may be applied to the images which may then be provided in preview.

Figure 10:
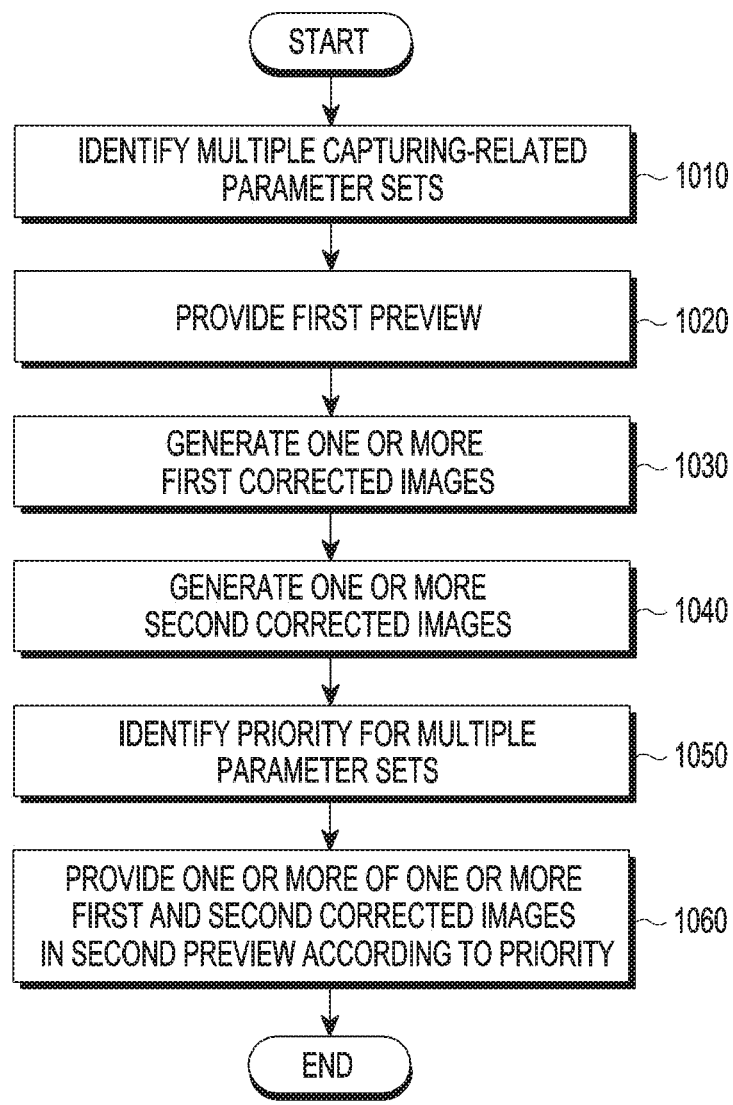
FIG. 10 is a flowchart illustrating a method of controlling an electronic device providing a quality-customized image according to an embodiment of the disclosure.

FIG. 10 is a flowchart illustrating a method of controlling an electronic device providing a quality-customized image according to an embodiment of the disclosure.

According to an embodiment, an electronic device 101 may be a camera-equipped portable electronic device (e.g., a smartphone or tablet PC) and may provide captured images of user-customized quality.

Referring to FIG. 10, the electronic device 101 (e.g., the processor 120) may identify a plurality of parameter sets related to image capturing from an external device in operation 1010. The external device may be a server 108 connected via a network with the electronic device 101 and capable of data transmission and reception in a cloud-based communication scheme and may provide the electronic device 101 with quality setting information reflecting the preference of the user of the electronic device 101 using a big data-based deep learning algorithm. The plurality of parameter sets may be provided to be able to display an appropriate quality of image considering the capturing environment or position of the electronic device 101 and, when there is user preference information previously identified, the user preference may additionally be considered. Each parameter set may be a combination of values associated with the quality of captured image (e.g., at least one value of light, color, shutter speed, focusing mode, or white balance set in the camera 180).

According to an embodiment, the electronic device 101 may obtain its position information using at least one of Wi-Fi, GPS, or a gyro sensor and obtain the plurality of parameter sets based on the position information. For example, when the electronic device 101 is identified to be located in Hawaii, the plurality of parameter sets may be provided considering quality setting information corresponding to prior images captured by the user in Hawaii or images captured by multiple users in Hawaii. According to an embodiment, the electronic device 101 may obtain the plurality of parameter sets based on information regarding the capturing environment. The capturing environment-regarding information may include at least one of capturing time, capturing target object, weather, place, or model of the electronic device 101. For example, when the electronic device 101 captures a night view image, the plurality of parameter sets may be provided considering quality setting information corresponding of prior images captured by the user or images captured by multiple users under a similar condition to that at the capturing time.

In operation 1020, the electronic device 101 (e.g., the processor 120) may provide at least part of the one or more images in a first preview on the display 160 during at least part of obtaining the one or more images using the camera 180. The first preview may display the one or more images in a quality corresponding to the setting parameter or capturing mode currently applied to the camera 180. According to an embodiment, the first preview may be provided with the setting parameter optimized for the current capturing environment set by the expert group or manufacturer of the electronic device 101 automatically being applied.

In operation 1030, the electronic device 101 (e.g., the processor 120) may apply a first parameter set of the plurality of parameter sets to the one or more images, thereby generating one or more first corrected images. In operation 1040, the electronic device 101 (e.g., the processor 120) may apply a second parameter set of the plurality of parameter sets to the one or more images, thereby generating one or more second corrected images. The one or more first corrected images and the one or more second corrected images may be images of quality identified to be preferred by the user of the electronic device 101 and may be provided in a second preview distinguished from the first preview.

In operation 1050, the electronic device 101 (e.g., the processor 120) may identify a priority for the plurality of parameter sets. The priority may be set based on profile information about the user of the electronic device 101. The user profile information may include at least one of the user's gender, age, country, or prior quality setting information. The priority may be identified by the electronic device 101 on its own or received from an external device. The priority may be used to identify one or more parameter sets to be applied to the one or more images among the plurality of parameter sets or order of display of one or more corrected images to which the one or more parameter sets have been applied.

During at least part of providing the first preview, the electronic device 101 (e.g., the processor 120) may, in operation 1060, provide, as the second preview, one or more of the one or more first corrected images and the one or more second corrected images. The second preview may be displayed on any one side of the first preview and may be provided at a lower resolution and smaller frame size than the image in the first preview. The images displayed in the second preview are not limited in number and may be displayed in an order based on the priority identified considering the user profile or capturing environment. An image selected by the user among one or more images displayed in the second preview may be increased for resolution and frame size and be displayed in the first preview. The electronic device 101 may additionally provide a setting menu to change the detailed quality settings of one or more images corresponding to the first preview or second preview on the display 160. The user may vary the detailed setting parameters to meet the user's desired quality of image through the setting menu.

According to an embodiment, the electronic device 101 may store one or more images corresponding to one or more previews selected from the first preview and the second preview displayed on the display 160. The one or more images stored may be used in identifying the user preference information. For example, the electronic device 101 may generate or update user preference information based on the parameter set corresponding to the one or more images stored and may adjust the priority using the user preference information. According to an embodiment, adjustment of the priority may be performed by an external electronic device or may be performed by the electronic device 101 based on the user preference information identified by the external electronic device.

According to an embodiment of the disclosure, a method of controlling an electronic device 101 configured to provide a quality-customized image may comprise identifying a plurality of parameter sets related to image capturing from an external device 1010; providing, in a first preview, at least part of one or more images using a display 160 during at least part of obtaining the one or more images 1020; generating one or more first corrected images to which a first parameter set among the plurality of parameter sets is applied, using the one or more images 1030; generating one or more second corrected images to which a second parameter set among the plurality of parameter sets is applied using the one or more images 1040; identifying priority for the plurality of parameter sets 1050; and providing, in a second preview, one or more among the one or more first corrected images and the one or more second corrected images according to the priority during at least part of providing the first preview 1060.

According to an embodiment, the method may further comprise storing one or more images corresponding to one or more previews selected from the first preview and the second preview.

According to an embodiment, the method may further comprise generating or updating user preference information based on a parameter set of the one or more images stored and adjusting the priority using the user preference information.

According to an embodiment, identifying the plurality of parameter sets may include obtaining position information about the electronic device 101 and identifying the plurality of parameter sets based on the position information.

According to an embodiment, identifying the plurality of parameter sets may include obtaining the plurality of parameter sets based on information regarding a capturing environment of the one or more images. The information regarding the capturing environment may include at least one of capturing time, capturing target object, weather, place, or model of the electronic device 101.

According to an embodiment, the priority may be set based on user profile information about the electronic device 101. The user profile information may include at least one of gender, age, country of a user of the electronic device 101, or prior quality setting information.

According to an embodiment, the parameter sets may include at least one value of light, color, shutter speed, focus mode, or white balance set in the camera 180.

According to an embodiment, the method may further comprise a setting menu to change a detailed setting of one or more images corresponding to the first preview or the second preview.

Figure 11:
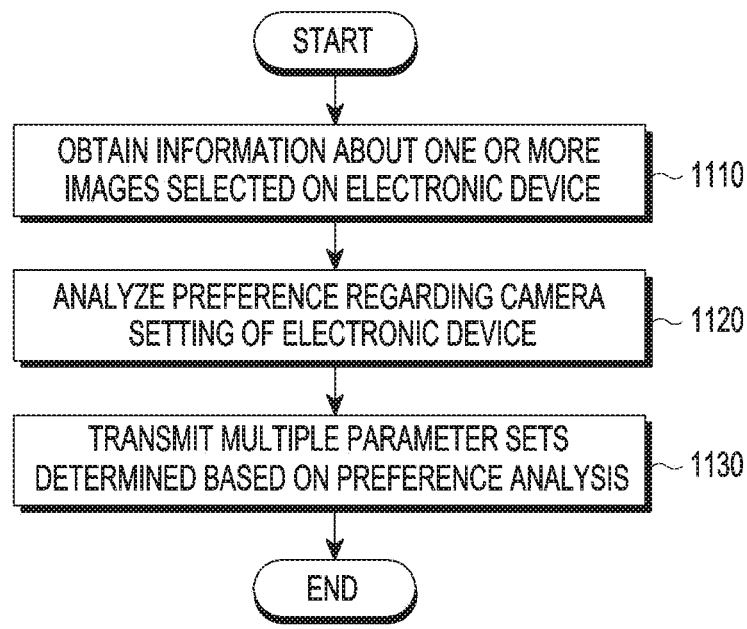
FIG. 11 is a flowchart illustrating a method of providing customized camera quality setting information for an electronic device by a server according to an embodiment of the disclosure.

FIG. 11 is a flowchart illustrating a method of providing customized camera quality setting information for an electronic device 101 by a server 108 according to an embodiment of the disclosure.

Referring to FIG. 11, a server 108 (e.g., the processor 530) may obtain information regarding one or more images selected by the electronic device 101 in operation 1110. The information regarding the one or more images may include at least one of a setting parameter set corresponding to the one or more images, position information, capturing environment information, or profile information about the user of the electronic device 101.

In operation 1120, the server 108 (e.g., the processor 530) may identify preference information regarding the camera settings of the electronic device 101 based on the information regarding the one or more images. The preference information may be information regarding a quality of image which may be preferred by the user, corresponding to at least one of the position of the electronic device 101 at the time of capturing, capturing environment, or user profile and may be analyzed using a big data-based deep learning algorithm. The preference information analysis may be repeatedly performed whenever gathering information regarding one or more images selected from the electronic device 101 or periodically at each designated time, and the statistics regarding selection by other users, as well as the preference of the user of the electronic device 101, may be taken into consideration.

In operation 1130, the server 108 (e.g., the processor 530) may identify a plurality of parameter sets related to image capturing on the electronic device 101 based on the preference information and transmit the identified parameter sets to the electronic device 101. The plurality of parameter sets may be quality setting information corresponding to a quality of image expected to be preferred by the user of the electronic device 101, and each parameter set may be constituted of a combination of at least one value of the light, color, shutter speed, focusing mode, or white balance set in the camera 180 of the electronic device 101.

FIG. 12 is a block diagram 1200 illustrating the program 140 according to various embodiments.

According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 1201, a window manager 1203, a multimedia manager 1205, a resource manager 1207, a power manager 1209, a database manager 1211, a package manager 1213, a connectivity manager 1215, a notification manager 1217, a location manager 1219, a graphic manager 1221, a security manager 1223, a telephony manager 1225, or a voice recognition manager 1227.

The application manager 1201, for example, may manage the life cycle of the application 146. The window manager 1203, for example, may manage one or more graphical user interface (GUI) resources that are used on a screen. The multimedia manager 1205, for example, may identify one or more formats to be used to play media files, and may encode or decode a corresponding one of the media files using a codec appropriate for a corresponding format selected from the one or more formats. The resource manager 1207, for example, may manage the source code of the application 146 or a memory space of the memory 130. The power manager 1209, for example, may manage the capacity, temperature, or power of the battery 189, and identify or provide related information to be used for the operation of the electronic device 101 based at least in part on corresponding information of the capacity, temperature, or power of the battery 189. According to an embodiment, the power manager 1209 may interwork with a basic input/output system (BIOS) (not shown) of the electronic device 101.

The database manager 1211, for example, may generate, search, or change a database to be used by the application 146. The package manager 1213, for example, may manage installation or update of an application that is distributed in the form of a package file. The connectivity manager 1215, for example, may manage a wireless connection or a direct connection between the electronic device 101 and the external electronic device. The notification manager 1217, for example, may provide a function to notify a user of an occurrence of a specified event (e.g., an incoming call, message, or alert). The location manager 1219, for example, may manage location information on the electronic device 101. The graphic manager 1221, for example, may manage one or more graphic effects to be offered to a user or a user interface related to the one or more graphic effects.

The security manager 1223, for example, may provide system security or user authentication. The telephony manager 1225, for example, may manage a voice call function or a video call function provided by the electronic device 101. The voice recognition manager 1227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 144 may dynamically delete some existing components or add new components. According to an embodiment, at least part of the middleware 144 may be included as part of the OS 142 or may be implemented as another software separate from the OS 142.

The application 146 may include, for example, a home 1251, dialer 1253, short message service (SMS)/multimedia messaging service (MMS) 1455, instant message (IM) 1257, browser 1259, camera 1261, alarm 1263, contact 1265, voice recognition 1267, email 1269, calendar 1271, media player 1273, album 1275, watch 1277, health 1279 (e.g., for measuring the degree of workout or biometric information, such as blood sugar), or environmental information 1281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 1269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Each of the aforementioned components of the electronic device may include one or more parts, and a name of the part may vary with a type of the electronic device. The electronic device in accordance with various embodiments of the disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with, e.g., a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120 of FIG. 1), may enable the processor to carry out a corresponding function. The computer-readable storage medium may be e.g., a memory (e.g., the memory 130 of FIG. 1).

The computer-readable storage medium may include a hardware device, such as hard discs, floppy discs, and magnetic tapes (e.g., a magnetic tape), optical media such as compact disc read only memories (CD-ROMs) and DVDs, magneto-optical media such as floptical disks, ROMs, random access memories (RAMs), flash memories, and/or the like. Examples of the program commands may include not only machine language codes but also high-level language codes which are executable by various computing means using an interpreter. The aforementioned hardware devices may be configured to operate as one or more software modules to carry out various embodiments of the disclosure, and vice versa.

Modules or programming modules in accordance with various embodiments of the disclosure may include at least one or more of the aforementioned components, omit some of them, or further include other additional components. Operations performed by modules, programming modules or other components in accordance with various embodiments of the disclosure may be carried out sequentially, simultaneously, repeatedly, or heuristically. Furthermore, some of the operations may be performed in a different order, or omitted, or include other additional operation(s).

According to an embodiment of the disclosure, there is provided a storage medium storing instructions configured to, when executed by at least one processor to enable the at least one processor to perform at least one operation that, in a method of controlling an electronic device configured to provide a quality-customized image, may comprise identifying a plurality of parameter sets related to image capturing from an external device, providing, in a first preview, at least part of one or more images using a display during at least part of obtaining the one or more images, generating one or more first corrected images to which a first parameter set among the plurality of parameter sets is applied, using the one or more images, generating one or more second corrected images to which a second parameter set among the plurality of parameter sets is applied, using the one or more images, identifying priority for the plurality of parameter sets, and providing, in a second preview, one or more among the one or more first corrected images and the one or more second corrected images according to the priority during at least part of providing the first preview.

According to an embodiment of the disclosure, there is provided a storage medium storing instructions configured to, when executed by at least one processor to enable the at least one processor to perform at least one operation that, in a method of providing customized camera quality setting information for an electronic device by a server, may comprise obtaining information regarding one or more images selected on the electronic device, identifying preference information regarding a camera setting of the electronic device based on the information regarding the one or more images, and providing a plurality of parameter sets based on the preference information to the electronic device to enable the electronic device to provide, in a preview, a corrected image resulting from applying at least part of the plurality of parameter sets to a captured image.

As is apparent from the foregoing description, according to various embodiments of the disclosure, an electronic device and method of controlling the same may select a user-preferred quality of image in a capturing process on a portable electronic device, identify the quality preference according to the user's selection accrued using a deep learning algorithm, and provide a user-customized quality of image. As the user's preference is reflected according to the capturing target or capturing environment at the time of capturing, more satisfaction and user convenience may be achieved by the camera equipped in the portable electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
    a camera;
    a display;
    a memory;
    a communication module; and
    a processor configured to:
        execute an application for obtaining an image using the camera, wherein the application is stored in the memory,
        identify a plurality of parameter sets for image correction, wherein the plurality of parameter sets are received from an external device using the communication module,
        obtain the image using the camera, based on a current setting of the camera, by the executed application,
        provide, in a first preview, the image obtained based on the current setting of the camera, using the display by the executed application,
        generate a first corrected image to which a first parameter set among the plurality of parameter sets is applied, using the image,
        generate a second corrected image to which a second parameter set among the plurality of parameter sets is applied, using the image, obtain a priority of the plurality of parameter sets by analyzing user preference information and assigning weights to the plurality of parameter sets accordingly, and during at least part of providing the first preview, provide, in a second preview, the first corrected image and the second corrected image according to the priority in real time by the executed application.

2. The electronic device of claim 1, wherein the processor is further configured to store one or more images corresponding to one or more previews selected from the first preview and the second preview.

3. The electronic device of claim 2, wherein the processor is further configured to:

update the user preference information based on a parameter set of the one or more images corresponding to the one or more selected previews, and adjust the priority of the plurality of parameter sets using the user preference information.

4. The electronic device of claim 1, further comprising:

a position information module, wherein the processor is further configured to:

obtain position information about the electronic device using the position information module, and obtain the plurality of parameter sets based on the position information.

5. The electronic device of claim 1, wherein the processor is further configured to obtain the plurality of parameter sets based on information regarding a capturing environment of the image, and wherein the information regarding the capturing environment includes at least one of a capturing time, a capturing target object, a weather, a place, or a model of the electronic device.

6. The electronic device of claim 1, wherein the priority of the plurality of parameter sets is set based on user profile information about a user of the electronic device, and wherein the user profile information includes at least one of a gender, age, or country of a user of the electronic device, or prior quality setting information.

7. The electronic device of claim 1, wherein the plurality of parameter sets include at least one value of light, color, shutter speed, focus mode, or white balance set in the camera.

8. The electronic device of claim 1, wherein the processor is further configured to additionally provide a setting menu to change a detailed setting of one or more images corresponding to the first preview or the second preview through the display.

9. A server configured to provide customized camera quality setting information for an electronic device, the server comprising:

a communication module;

a memory; and a processor configured to:

execute an application for obtaining an image using a camera of the electronic device, wherein the application is stored in the memory, obtain information regarding one or more images selected by a user of the electronic device, based on a current setting of the camera, by the executed application, identify preference information regarding a camera setting of the electronic device based on the information regarding the one or more images, and provide a plurality of parameter sets based on the preference information by analyzing user preference information and assigning weights to the plurality of parameter sets accordingly to the electronic device via the communication module to enable the electronic device to provide, in a preview, a corrected image resulting from applying at least part of the plurality of parameter sets to a captured image in real time by the executed application.

10. The server of claim 9, wherein the information regarding the one or more images includes at least one of a setting parameter set corresponding to the one or more images, position information, capturing environment information, or profile information about the user of the electronic device.

11. The server of claim 9, wherein the processor is further configured to:

classify a setting parameter set corresponding to the one or more images according to at least one item among position information about the one or more images, capturing environment information, or user profile information, assign a weight thereto, and identify preference information about the camera setting of the electronic device based on the weight.

12. The server of claim 9, wherein the processor is further configured to, when a camera of the electronic device is identified to operate, obtain information for image correction at a time of the operation and provide the plurality of parameter sets corresponding to the information for image correction according to a priority identified based on the preference information.

13. A method of controlling an electronic device configured to provide a quality-customized image, the method comprising:

executing an application for obtaining an image using a camera, wherein the application is stored in a memory of the electronic device;

identifying a plurality of parameter sets for image correction, wherein the plurality of parameter sets are received from an external device;

obtaining the image using the camera of the electronic device, based on a current setting of the camera, by the executed application;

providing, in a first preview, the image obtained based on the current setting of the camera, using a display by the executed application;

generating a first corrected image to which a first parameter set among the plurality of parameter sets is applied, using the image;

generating a second corrected image to which a second parameter set among the plurality of parameter sets is applied, using the image;

obtaining a priority of the plurality of parameter sets by analyzing user preference information and assigning weights to the plurality of parameter sets accordingly; and during at least part of providing the first preview, providing, in a second preview, the first corrected image and the second corrected image according to the priority in real time by the executed application.

14. The method of claim 13, further comprising storing one or more images corresponding to one or more previews selected from the first preview and the second preview.

15. The method of claim 14, further comprising:

updating the user preference information based on a parameter set of the one or more images corresponding to the one or more selected previews; and adjusting the priority of the plurality of parameter sets using the user preference information.

16. The method of claim 13, wherein the identifying of the plurality of parameter sets includes:
obtaining position information about the electronic device; and
identifying the plurality of parameter sets based on the position information.

17. The method of claim 13,
wherein the identifying of the plurality of parameter sets includes obtaining the plurality of parameter sets based on information regarding a capturing environment of the image, and
wherein the information regarding the capturing environment includes at least one of capturing time, capturing target object, weather, place, or model of the electronic device.

18. The method of claim 13,
wherein the priority of the plurality of parameter sets is set based on user profile information about a user of the electronic device, and
wherein the user profile information includes at least one of a gender, age, or country of the user of the electronic device, or prior quality setting information.

19. The method of claim 13, wherein the plurality of parameter sets include at least one value of light, color, shutter speed, focus mode, or white balance set in a camera.

20. The method of claim 13, further comprising additionally providing a setting menu to change a detailed setting of one or more images corresponding to the first preview or the second preview.

* * * * *